(12) United States Patent
Paz et al.

(10) Patent No.: US 12,081,467 B2
(45) Date of Patent: Sep. 3, 2024

(54) MODULATION ORDER OF A FRACTION OF PDSCH SYMBOLS FOR PHASE NOISE HANDLING

(71) Applicant: QUALCOMM Incorporated, San Diego, CA (US)

(72) Inventors: Daniel Paz, Geva Carmel (IL); Alexei Yurievitch Gorokhov, San Diego, CA (US); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 17/336,296

(22) Filed: Jun. 1, 2021

(65) Prior Publication Data

US 2022/0385418 A1    Dec. 1, 2022

(51) Int. Cl.
*H04L 5/00* (2006.01)
*H04W 72/04* (2023.01)
(Continued)

(52) U.S. Cl.
CPC .......... *H04L 5/0032* (2013.01); *H04W 72/23* (2023.01); *H04W 72/51* (2023.01)

(58) Field of Classification Search
CPC .... H04W 72/23; H04W 72/51; H04L 1/1896; H04L 5/0032; H04L 1/0007;
(Continued)

(56) References Cited

U.S. PATENT DOCUMENTS

2014/0269627 A1* 9/2014 Gorokhov ......... H04W 72/0446
  370/336
2018/0343653 A1* 11/2018 Guo .................... H04W 72/542
(Continued)

FOREIGN PATENT DOCUMENTS

WO    2017096558 A1    6/2017
WO    2017222534 A1    12/2017

OTHER PUBLICATIONS

Huawei, et al., "PDSCH/PUSCH Enhancements for 52-71GHz Band", 3GPP TSG RAN WG1 Meeting #104-e, R1-2100201, 3rd Generation Partnership Project (3GPP), Mobile Competence Centre, 650, Route Des Lucioles, F-06921 Sophia-Antipolis Cedex, France, vol. RAN WG1, No. E-meeting, Jan. 25, 2021-Feb. 5, 2021, Jan. 19, 2021 (Jan. 19, 2021), XP051970833, 16 Pages, Section 4.3.2.

(Continued)

*Primary Examiner* — Awet Haile
(74) *Attorney, Agent, or Firm* — Procopio, Cory, Hargreaves & Savitch LLP

(57) ABSTRACT

The base station may transmit to the UE, a first part and a second part of a PDSCH. The UE may decode the second part of the PDSCH. The first part of the PDSCH may be associated with a higher MCS than the second part of the PDSCH. The UE may estimate at least one of an ICI or a CPE associated with the PDSCH based on the decoding of the second part of the PDSCH. The UE may decode the first part of the PDSCH based on the decoding of the second part of the PDSCH. Decoding the first part of the PDSCH based on the decoding of the second part of the PDSCH may include correcting for the at least one of the ICI or the CPE associated with the PDSCH.

24 Claims, 13 Drawing Sheets

(51) Int. Cl.
*H04W 72/23* (2023.01)
*H04W 72/51* (2023.01)

(58) Field of Classification Search
CPC ... H04L 1/1812; H04L 1/1825; H04L 1/1861;
H04L 1/1864; H04L 1/20; H04L 1/203
See application file for complete search history.

(56) References Cited

U.S. PATENT DOCUMENTS

| 2018/0359071 | A1* | 12/2018 | Lee | H04L 7/0054 |
| 2019/0132089 | A1* | 5/2019 | Hwang | H04L 1/1825 |
| 2020/0252179 | A1* | 8/2020 | Kim | H04W 72/1268 |
| 2022/0123855 | A1* | 4/2022 | Park | H04L 1/0003 |
| 2022/0311647 | A1* | 9/2022 | Cheng | H04L 27/2675 |
| 2022/0361024 | A1* | 11/2022 | Xue | H04L 1/1812 |

OTHER PUBLICATIONS

International Search Report and Written Opinion—PCT/US2022/027809—ISA/EPO—Aug. 5, 2022.
Qualcomm Incorporated: "PT-RS Considerations", 3GPP TSG-RAN WG1 Meeting #92bis, R1-1804793, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427060, 11 Pages, Sections 2 and 4.

\* cited by examiner

FIG. 6A — Time density of PT-RS as a function of scheduled MCS

FIG. 6B — Frequency density of PT-RS as a function of scheduled bandwidth

MODULATION ORDER OF A FRACTION OF PDSCH SYMBOLS FOR PHASE NOISE HANDLING

INTRODUCTION

The present disclosure relates generally to communication systems, and more particularly, to wireless communication that includes blind phase noise (PN) estimation.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided. The method may be performed by a user equipment (UE). The method includes receiving, from a base station, a first part and a second part of a physical downlink share channel (PDSCH). The first part of the PDSCH is associated with a higher modulation and coding scheme (MCS) than the second part of the PDSCH. The method includes decoding the second part of the PDSCH and decoding the first part of the PDSCH based on the decoding of the second part of the PDSCH.

In another aspect of the disclosure, an apparatus is provided. The apparatus may be a UE. The apparatus includes a memory and at least one processor coupled to the memory, the memory and the at least one processor configured to receive, from a base station, a first part and a second part of a PDSCH. The first part of the PDSCH is associated with a higher MCS than the second part of the PDSCH. The memory and at least one processor are configured to decode the second part of the PDSCH and decode the first part of the PDSCH based on the decoding of the second part of the PDSCH.

In another aspect of the disclosure, an apparatus is provided. The apparatus includes means for receiving, from a base station, a first part and a second part of a PDSCH. The first part of the PDSCH is associated with a higher MCS than the second part of the PDSCH. The apparatus includes means for decoding the second part of the PDSCH and decoding the first part of the PDSCH based on the decoding of the second part of the PDSCH.

In another aspect of the disclosure, a computer-readable medium is provided. The computer-readable medium includes code which, when executed by at least one processor, causes the at least one processor to receive, from a base station, a first part and a second part of a PDSCH. The first part of the PDSCH is associated with a higher MCS than the second part of the PDSCH. The computer-readable medium includes code to decode the second part of the PDSCH and decode the first part of the PDSCH based on the decoding of the second part of the PDSCH.

In an aspect of the disclosure, a method is provided. The method may be performed by a base station. The method includes constructing a first part and a second part of a PDSCH. The first part of the PDSCH is associated with a higher MCS than the second part of the PDSCH. The method includes transmitting, to a UE, the PDSCH including the first part and the second part.

In another aspect of the disclosure, an apparatus is provided. The apparatus may be a base station. The apparatus includes a memory and at least one processor coupled to the memory, the memory and the at least one processor configured to construct a first part and a second part of a PDSCH. The first part of the PDSCH is associated with a higher MCS than the second part of the PDSCH. The memory and the at least one processor are configured to transmit, to a UE, the PDSCH including the first part and the second part.

In another aspect of the disclosure, an apparatus is provided. The apparatus includes means for constructing a first part and a second part of a PDSCH. The first part of the PDSCH is associated with a higher MCS than the second part of the PDSCH. The apparatus includes means for transmitting, to a UE, the PDSCH including the first part and the second part.

In another aspect of the disclosure, a computer-readable medium is provided. The computer-readable medium includes code which, when executed by at least one processor, causes the at least one processor to construct a first part and a second part of a PDSCH. The first part of the PDSCH is associated with a higher MCS than the second part of the PDSCH. The computer-readable medium includes code to transmit, to a UE, the PDSCH including the first part and the second part.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A is a diagram illustrating the time density of the PT-RS as a function of the scheduled MCS.

FIG. 6B is a diagram illustrating the frequency density of the PT-RS as a function of the scheduled bandwidth.

DETAILED DESCRIPTION

Figure 1:
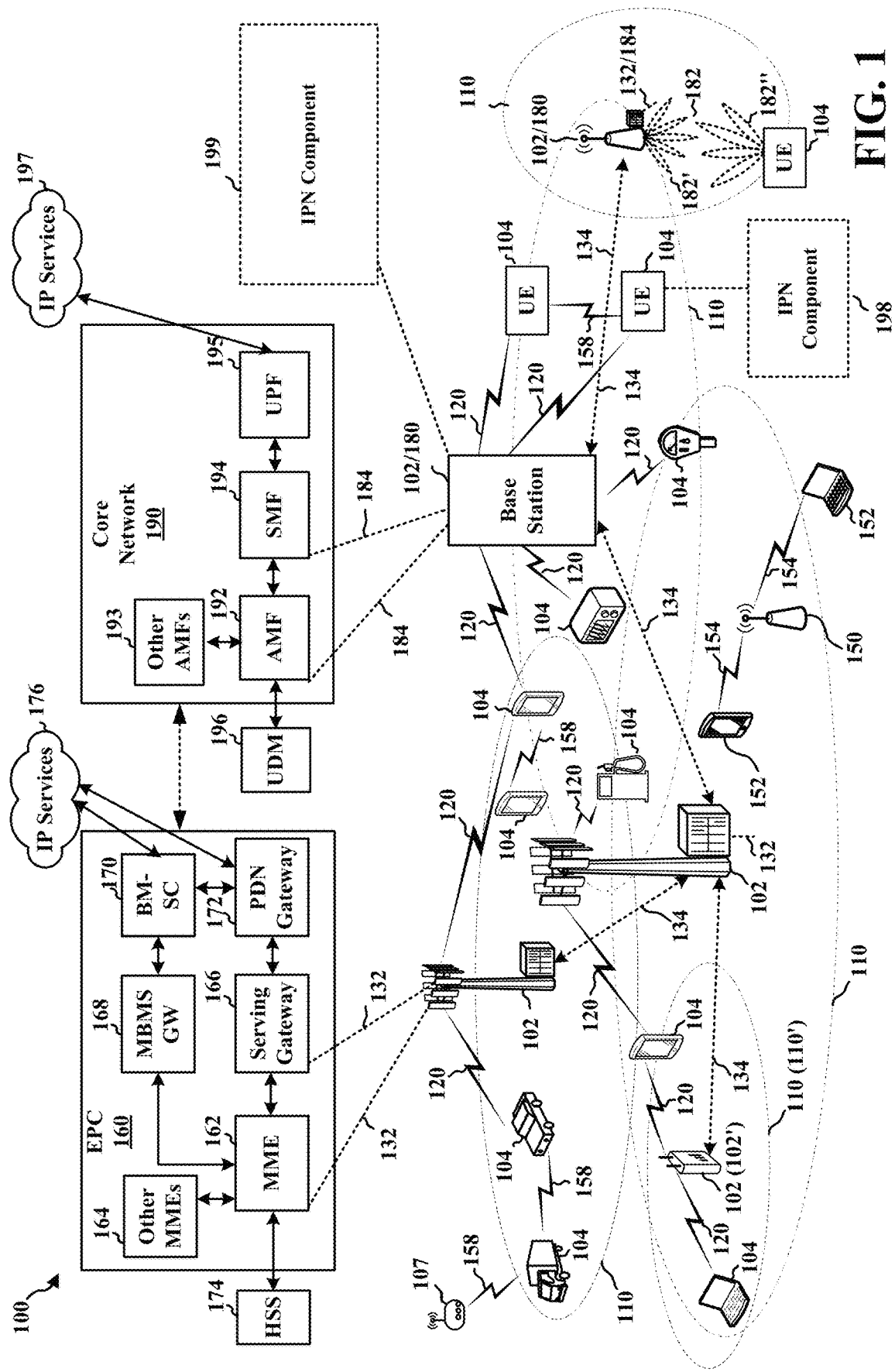
FIG. 1 is a diagram illustrating an example of a wireless communications system and an access network.

In frequency range 2 (FR2) the phase noise (PN) may become an impairment due to the increase in the carrier frequency. A phase tracking reference signal (PT-RS) may be transmitted for the purpose of PN and residual frequency offset estimation and correction. The estimation and correction may be performed for each slot. The PT-RS may be one of the PDSCH pilots, may be carried by the PDSCH, and may be defined by a gold sequence. The PT-RS may be allocated using one resource element (RE) per 2 or 4 resource blocks (RBs) (2 being the most common) and per 1, 2, or 4 data symbols (1 being the most common). The typical millimeter wave (mmW) frame structure may have 1 demodulation reference signal (DMRS) symbol. Accordingly, the frequency tracking loop may have some residual frequency error and PTRS may be utilized to track the phase that is developed within the slot.

The PN may be a multiplicative process in the time domain that may result in cyclic convolution of the PDSCH with the corresponding PN taps in the frequency domain. Uncompensated PN may lead to common phase error (CPE) and/or inter-carrier-interference (ICI) related error floor, which may be significant in some scenarios when the integrated PN (IPN) is strong enough. With suitable PN mask characteristics, the PN related ICI may be relevant for a high signal-to-noise ratio (SNR) region that is associated with high MCS options and correspondingly high modulation orders. ICI taps or sequences representing the frequency domain PN response may be different from symbol to symbol, but may be the same for all its REs and typically on all transmit (Rx)/receive (Tx) (Tx/Rx) antennas.

The PT-RS may be associated with a limited throughput, and may not enable ICI correction. The PT-RS pilots may address CPE estimation and correction, and may not address ICI estimation and correction. Thus, uncompensated ICI may lead to an error floor that may limit the maximum throughput even after the PT-RS based CPE estimation and correction (e.g., by limiting the highest operational MCS). The PT-RS pilots may not carry data and thus may limit the potential throughput per SNR point due to an increased overhead (or equivalently because of the increased effective code rate per MCS).

Aspects described herein may relate to modulation order and code rate restriction for a fraction of REs of PDSCH symbols (e.g., a fraction of REs of an allocation) for the purpose of PN handling in order to support a data-aided method that may enable efficient mitigation of PN related ICI along with CPE with (a) limited or no pilot overhead. In particular, a blind PN estimation may be utilized.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an integrated phase noise (IPN) component 198 that may be configured to receive, from a base station, a first part and a second part of a PDSCH. The first part of the PDSCH may be associated with a higher MCS than the second part of the PDSCH. The IPN component 198 may be configured to decode the second part of the PDSCH. The IPN component 198 may be configured to decode the first part of the PDSCH based on the decoding of the second part of the PDSCH. In certain aspects, the base station 180 may include an IPN component 199 that may be configured to construct a first part and a second part of a PDSCH. The first part of the PDSCH may be associated with a higher MCS than the second part of the PDSCH. The IPN component 199 may be configured to transmit, to a UE, the PDSCH including the first part and the second part. Although the following description may be focused on 5G NR, the concepts described herein may be applicable to other similar areas, such as LTE, LTE-A, CDMA, GSM, and other wireless technologies.

Figure 2:
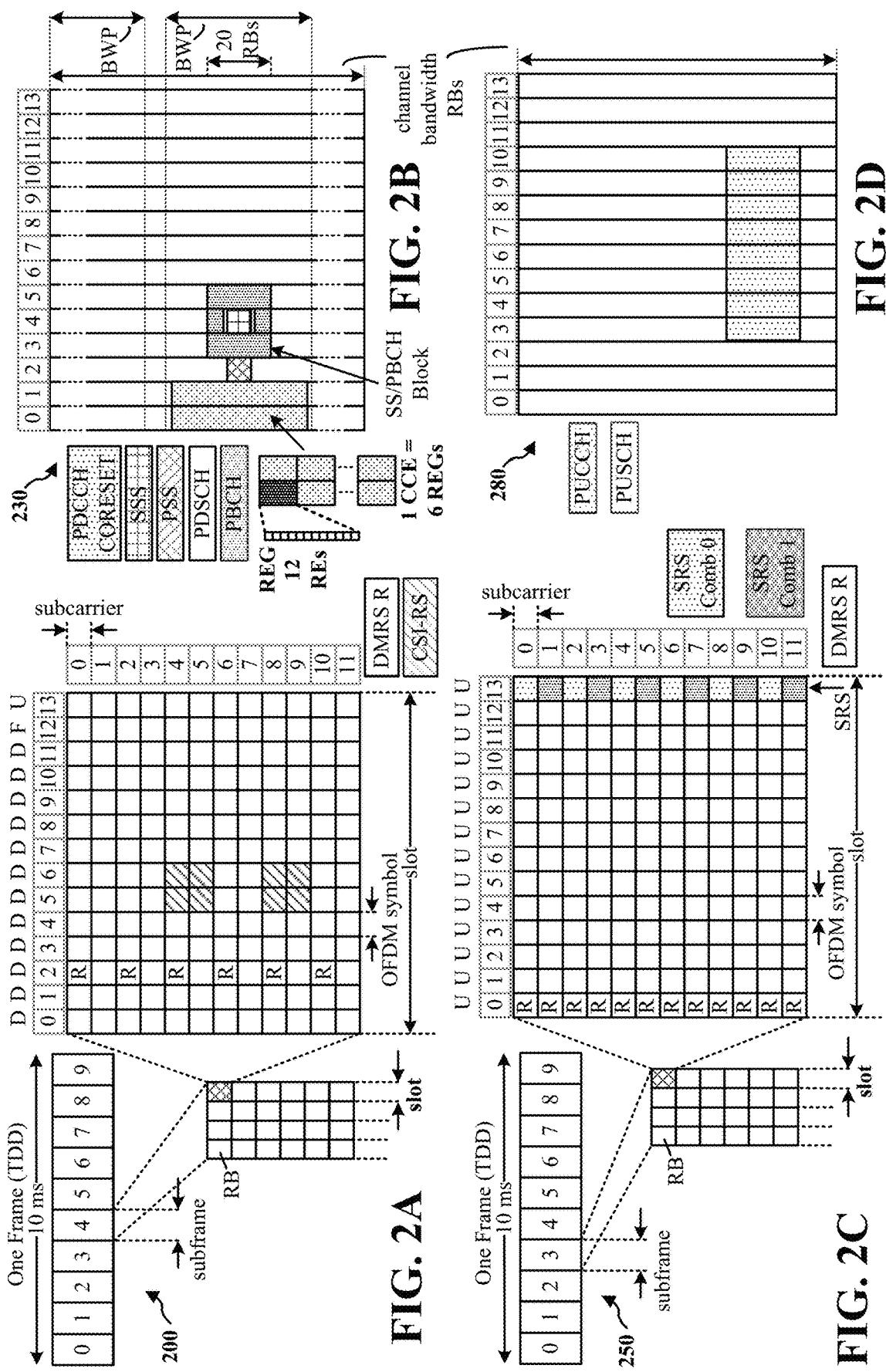
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
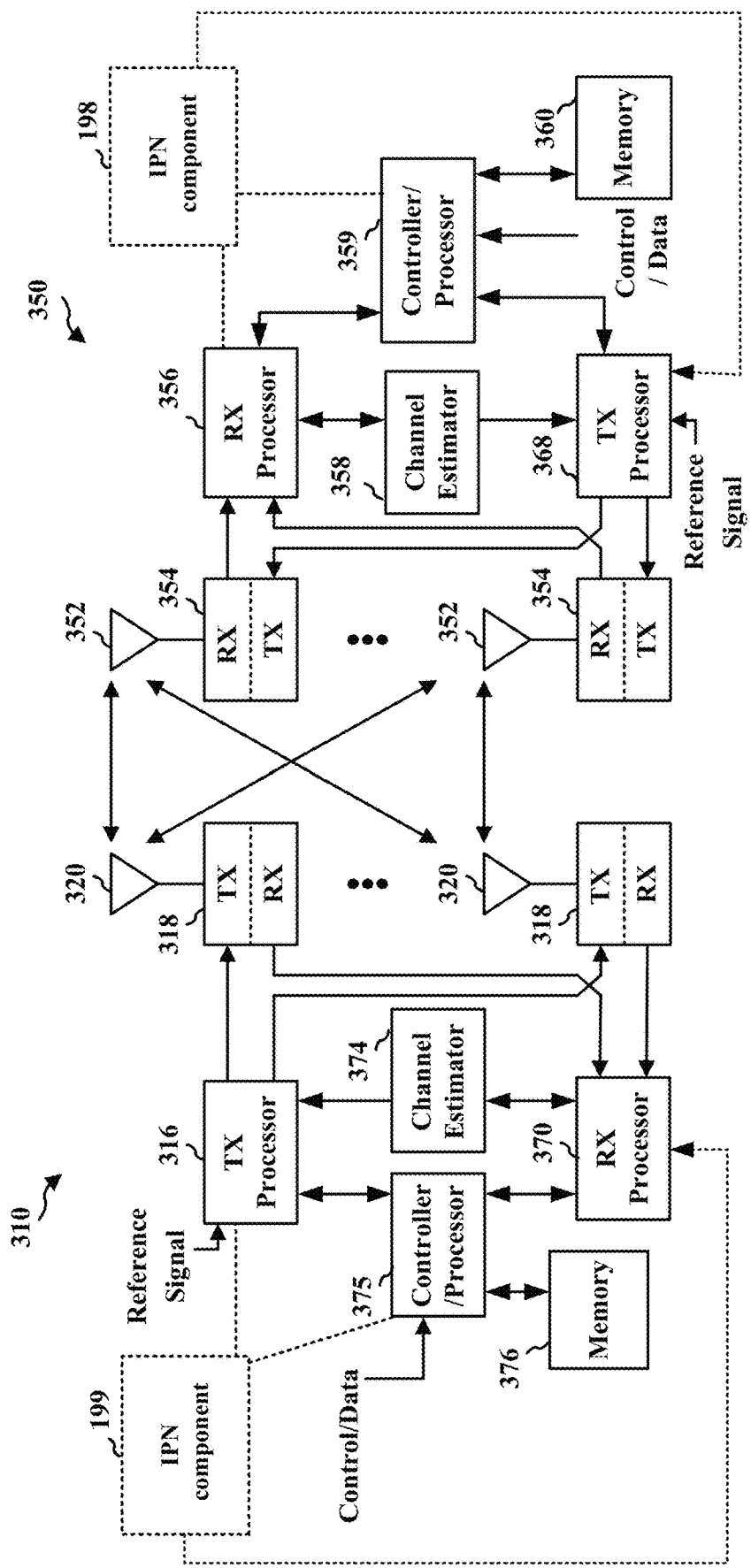
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Aspects presented herein provide a data-aided PN mitigation method that includes a restriction of the modulation order and/or the code rate for a fraction of the PDSCH REs. When severe PN exists, that is, when the PN is dominant, or at least non-negligible for the communication, compared to other noise such as additive noise or a channel estimation error, the CPE and ICI correction may be utilized to maximize the throughput at a high SNR. In contrast to CPE, which may be estimated using distributed pilots (e.g., the conventional PT-RS), the ICI estimation and correction may involve a contiguous pilot in the frequency domain with a sufficient length in order to capture the ICI effect. The contiguous pilot occupying a particular frequency domain band may result in an increased overhead.

In order to reduce or avoid the overhead associated with the continuous pilot, a data-aided approach for PN mitigation may be utilized. In particular, an enhanced PT-RS (ePTRS) waveform (with contiguous REs) distributed implicitly over a selected range of contiguous PDSCH REs may be transmitted with a restricted modulation order and/or code rate (e.g., with a restricted MCS index) without any dedicated pilot allocation. This band of REs may be referred to as the PDSCH part 2, and the rest of the REs may be referred to as the PDSCH part 1. The MCS used for the PDSCH part 2 may not be sensitive to a PN related ICI floor. Accordingly, the restriction on the MCS index may be performed in order to enable reliable decoding of the PDSCH part 2 REs prior to the ICI mitigation.

Instead of using dedicated pilots, the blind estimation and correction of CPE and ICI for the PDSCH data as described herein may be based on a four-step data aided approach. In step 1, an equalization of the PDSCH part 2 and a blind estimation of CPE may be performed. In step 2, CPE correction for the PDSCH part REs may be performed, followed by the decoding of the PDSCH part 2 data. The limited MCS used for the PDSCH part 2 may not be sensitive to a PN related ICI impairment. In step 3, with reliable decoding, the decoded data of the PDSCH part 2 may be used as a contiguous pilot for ICI mitigation. Accordingly, a CPE and ICI estimation may be performed based on the PDSCH part 2 decoded data. In step 4, as a result of the ICI floor removal, an increased MCS index compared to that used for the PDSCH part 2 may be used for the PDSCH part 1. The CPE and ICI correction for the PDSCH part 1 REs may be performed before the equalization, demodulation, and decoding of the PDSCH part 1 are performed.

Figure 4:
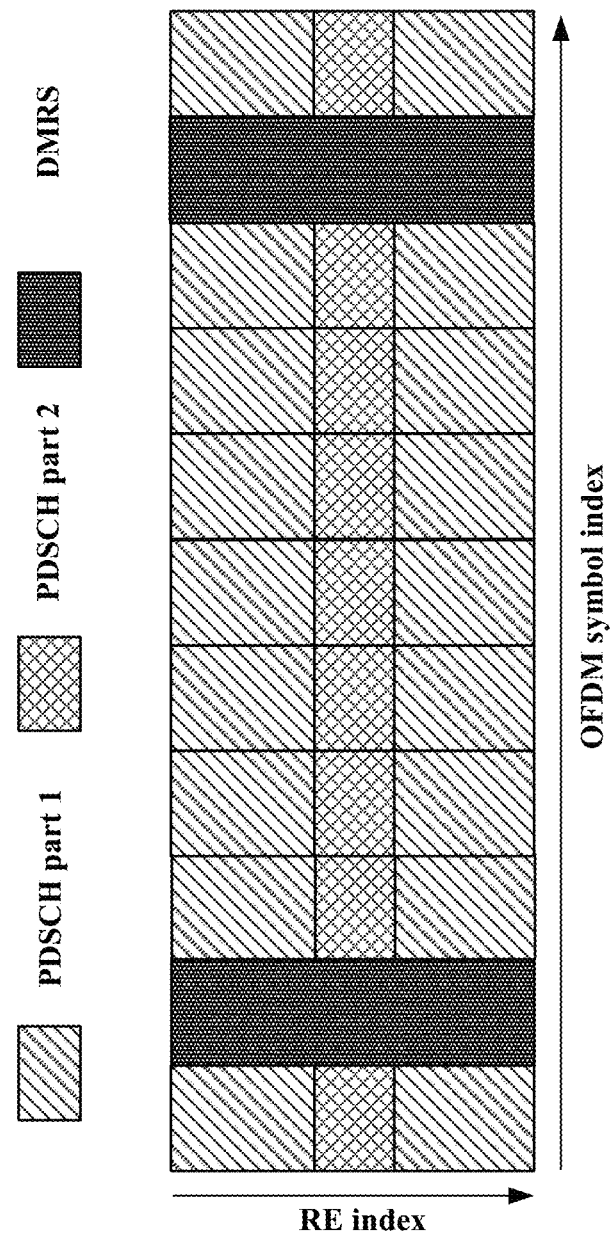
FIG. 4 is a diagram illustrating an example of the PDSCH waveform allocation according to some aspects of the disclosure.

FIG. 4 is a diagram 400 illustrating an example of the PDSCH waveform allocation according to some aspects of the disclosure. As shown in FIG. 4, the PDSCH part 2 data may be allocated on a contiguous band in the frequency domain and may occupy a relatively small fraction of the composite allocation. Both the PDSCH part 1 and the PDSCH part 2 data may be OFDM modulated.

Figure 5:
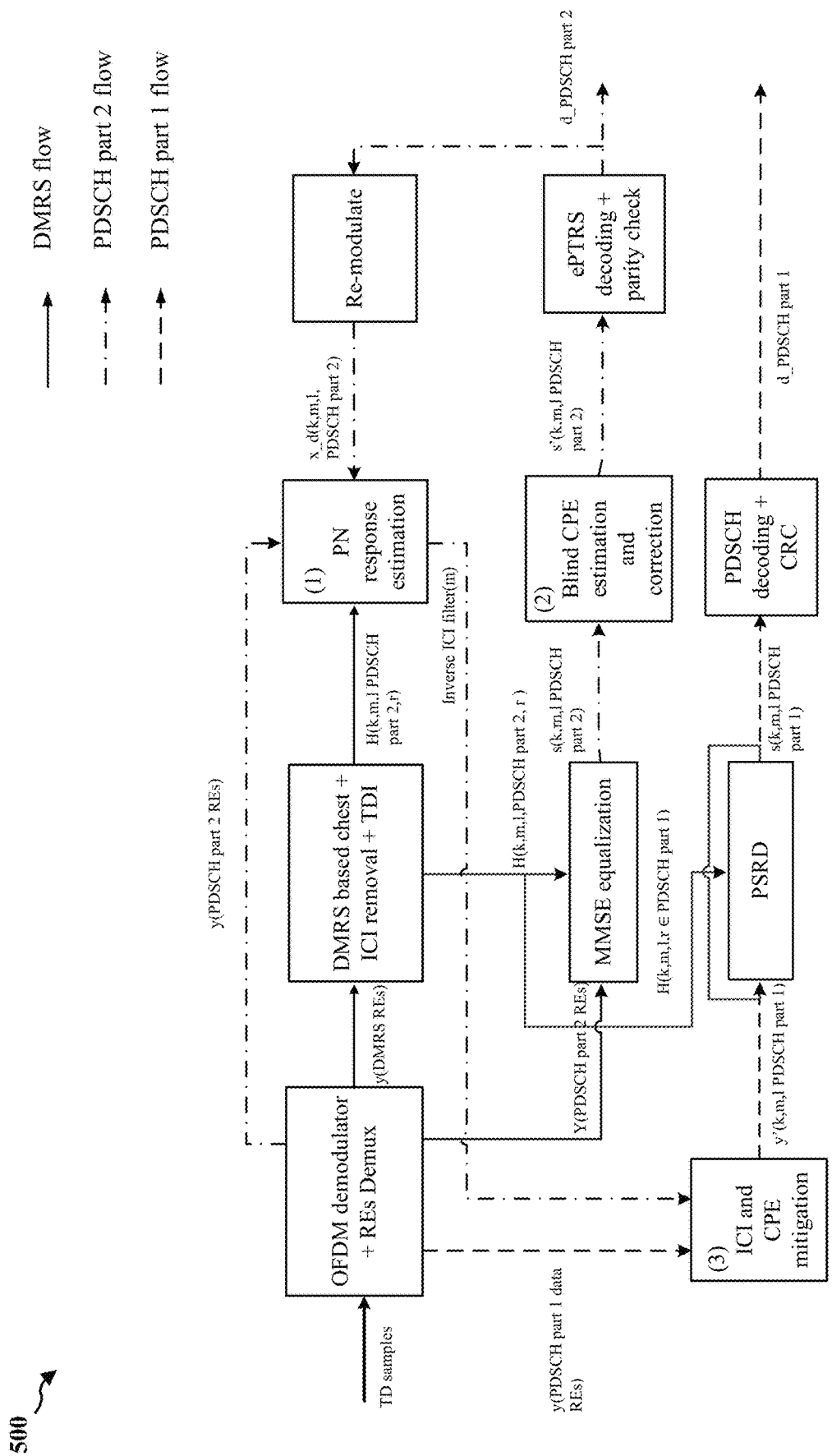
FIG. 5 is a diagram illustrating a PDSCH processing flow for the downlink scenario according to aspects of the disclosure.

FIG. 5 is a diagram illustrating a PDSCH processing flow 500 for the downlink scenario according to aspects of the disclosure. In the downlink, the Rx PN may be dominant as a result of the UE Rx oscillator or phase locked loop (PLL). Accordingly, the received signal in the frequency domain may be represented as:

$$Y=I\otimes(H*P*X+N),$$

where Y is the received signal, H is the channel matrix, P is the precoding matrix, I is the PN frequency response, X is the transmitted signal, and N is additive gaussian noise. It may be assumed that the PN may be the same for all Rx antennas. The ICI correction may be performed on PDSCH samples prior to channel response removal or equalization.

Whether with a single stream or MIMO (e.g., two streams or more), after decoding the PDSCH part 2, data streams may be re-modulated and multiplied by the estimated channel (e.g., per layer and per Rx based on DMRS). Finally, combining all the streams may yield the reference samples for the PN response estimation.

Figure 6C:
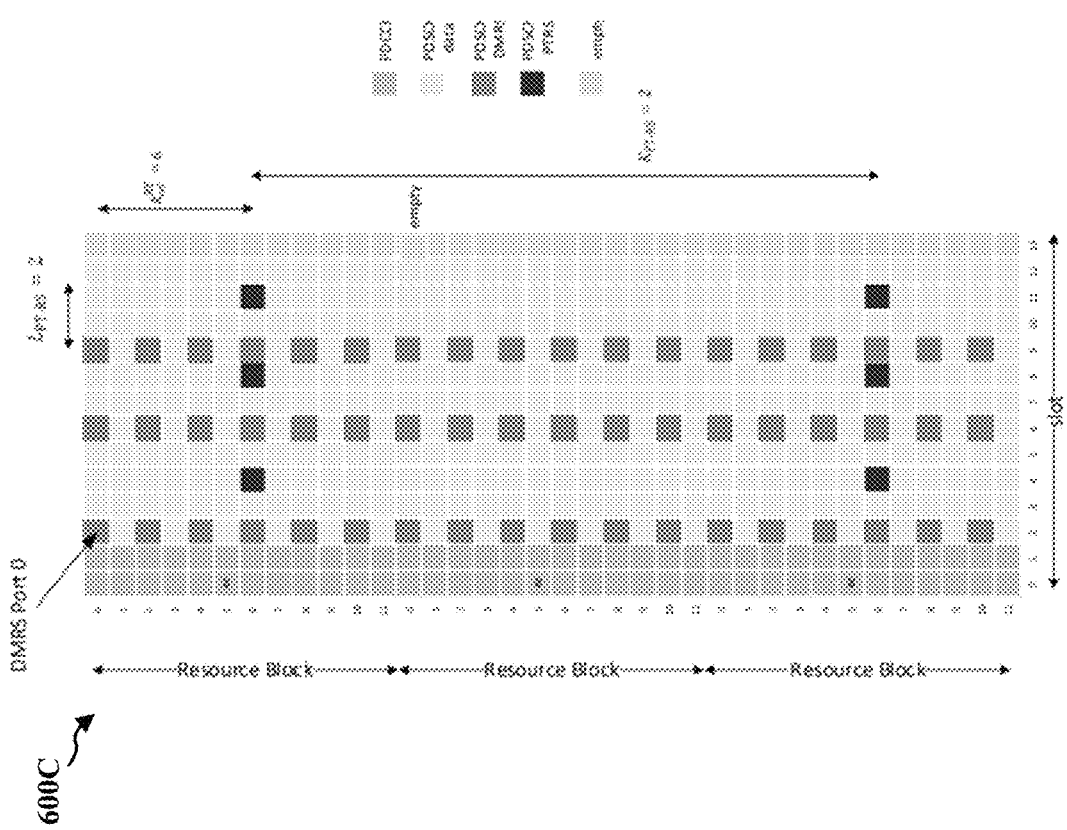
FIG. 6C is a diagram illustrating an example time-frequency resource allocation for the PDSCH PT-RS.

FIGS. 6A-C are diagrams related to the PDSCH PT-RS mapping. FIG. 6A is a diagram 600A illustrating the time density of the PT-RS as a function of the scheduled MCS. The PT-RS may be mapped with the time grid $L_{PT-RS}$ while skipping DMRS symbols. The time grid $L_{PT-RS}$ may be derived based on the diagram illustrated in FIG. 6A. The MCS thresholds in the diagram may be configured by the network. If the MCS thresholds are not explicitly configured, default threshold values may be used. The MCS threshold preferences may be signaled in the UE capability information. FIG. 6B is a diagram 600B illustrating the frequency density of the PT-RS as a function of the scheduled bandwidth. The PT-RS may be mapped with the frequency grid $K_{PT-RS}$. The frequency grid $K_{PT-RS}$ may be derived based on the diagram illustrated in FIG. 6B, and may be dependent on the number of allocated RBs $K_{RB}$. The bandwidth thresholds in the figure may be configured by the network. If the bandwidth thresholds are not explicitly configured, default threshold values may be used. The bandwidth threshold preferences may be signaled in the UE capability information. FIG. 6C is a diagram 600C illustrating an example time-frequency resource allocation for the PDSCH PT-RS.

As stated before, in this IDF we propose the concept of modulation order and code rate restriction for a fraction of REs of PDSCH symbols (fraction of REs of an allocation) for the purpose of PN handling in order to support novel data-aided algorithms that will enable mitigation of the PN related ICI+CPE with a limited/no overhead.

Figure 7:
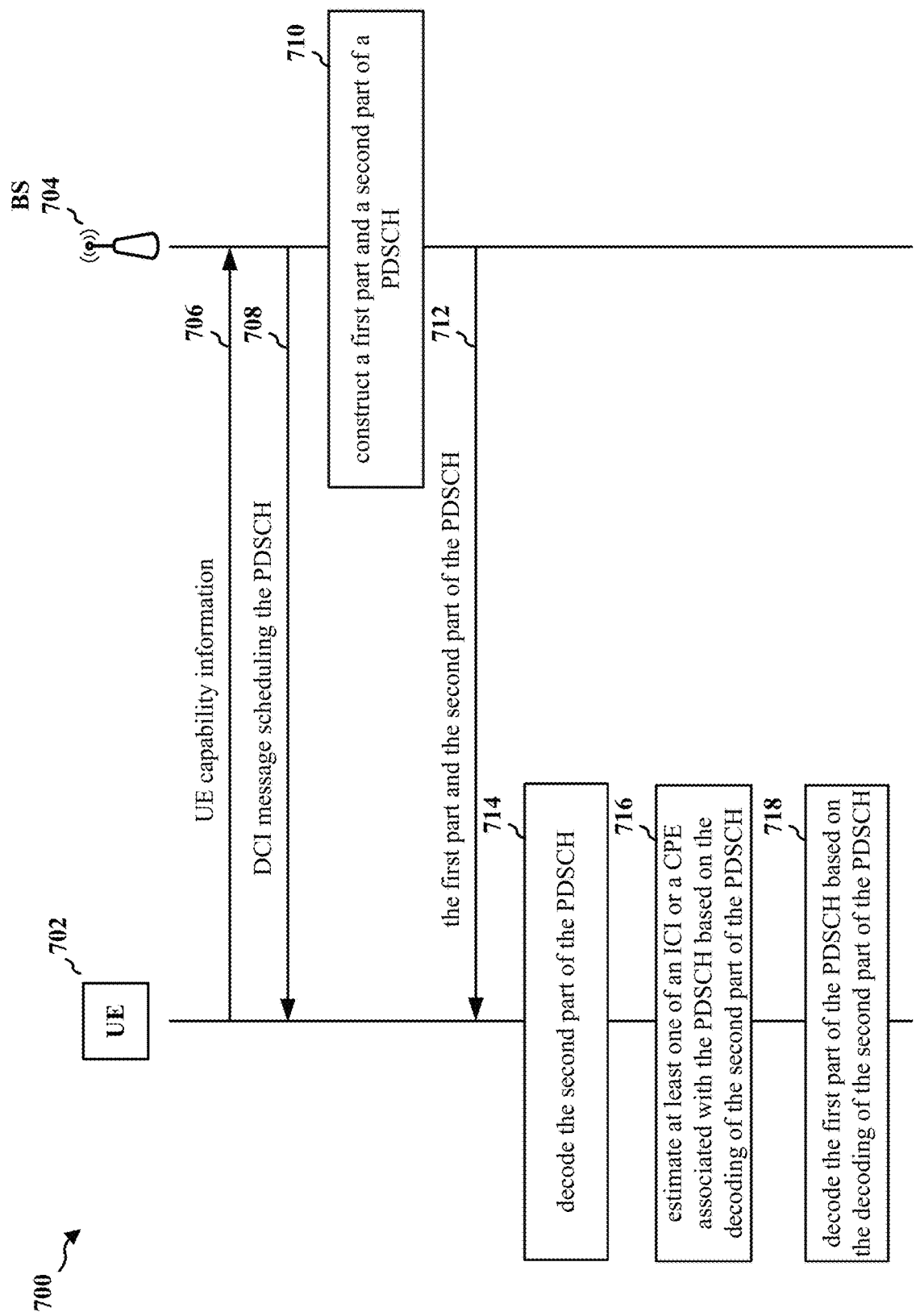
FIG. 7 is a communication flow of a method of wireless communication.

FIG. 7 is a communication flow 700 of a method of wireless communication. The UE 702 may correspond to the UE 104/350. The base station 704 may correspond to the base station 102/180/310. At 706, the UE 702 may transmit to the base station 704, and the base station 704 may receive from the UE 702, UE capability information relating to the reception of the first part and the second part of the PDSCH. At 708, the base station 704 may transmit to the UE 702, and the UE 702 may receive from the base station 704, a DCI message scheduling the PDSCH. At 710, the base station 704 may construct a first part and a second part of a PDSCH. The first part of the PDSCH may be associated with a higher MCS than the second part of the PDSCH. At least one of an ICI or a CPE associated with the PDSCH may be estimatable based on the second part of the PDSCH. At 712, the base station 704 may transmit to the UE 702, and the UE 702 may receive from the base station 704, the first part and the second part of the PDSCH. At 714, the UE 702 may decode the second part of the PDSCH. At 716, the UE may estimate at least one of an ICI or a CPE associated with the PDSCH based on the decoding of the second part of the PDSCH. At 718, the UE may decode the first part of the PDSCH based on the decoding of the second part of the PDSCH. Decoding the first part of the PDSCH based on the decoding of the second part of the PDSCH may include correcting for the at least one of the ICI or the CPE associated with the PDSCH.

The base station 704 may apply an MCS limitation for the PDSCH part 2 REs so the PDSCH part 2 data may be decoded at the UE 702 reliably. The decoded PDSCH part 2 data may support the blind CPE and ICI mitigation process at the UE 702.

The base station 704 may indicate in the DCI message 708 the suggested composite PDSCH allocation. For example, whether or not the PDSCH part 2 is used may be indicated in the DCI message in each allocation. In one configuration, the PDSCH part 1 and the PDSCH part 2 may be parts of a single TB. The PDSCH part 1 and the PDSCH part 2 may use different subsets of code blocks (CB) and different MCSs. In one configuration, two separated TBs may be used for the PDSCH part 1 and the PDSCH part 2 PDSCH.

The base station 704 may indicate in the DCI message at 708 the MCS indexes for the PDSCH part 1 and the PDSCH part 2 in the composite PDSCH allocation. In one configuration, a composite MCS index or a code for an MCS pair may be used where the PDSCH part 1 and the PDSCH part 2 are parts of a single TB. In one configuration, the MCS index for the PDSCH part 2 may be predefined and implicit, and the MCS for the PDSCH part 1 may be explicitly indicated in the DCI message at 708.

In one configuration, the base station 704 may separately indicate the size and the location of the PDSCH part 1 and the PDSCH part 2 in the DCI message at 708. In one configuration, the base station 704 may indicate a composite allocation size descriptor (e.g., signal a PDSCH part 2 size and its location relative to or as a paired combination with PDSCH part 1 allocation size and location) in the DCI message at 708. For example, in the DCI message, the size and the location of the PDSCH part 2 may be indicated relative to or as a paired combination with the size and the location of the PDSCH part 1. In one configuration, the size and the location of the PDSCH part 2 may be predefined and implicit, either in absolute terms or in terms relative to the PDSCH part 1 allocation. The size and the location of the PDSCH part 1 may be explicitly indicated in the DCI message as usual.

The PDSCH part 2 may be allocated on a single component carrier (CC) even when a multi-CC allocation of the PDSCH is used. The same PN characteristics may be shared by all the CCs, and the ICI estimation may be based on a single CC.

The blind ICI mitigation described herein may be used in the context of a high order quadrature amplitude modulation (QAM) (e.g., 1024QAM) for FR2 or higher bands as the PN may dominate the error floor in the high SNR region. The blind ICI mitigation described herein may also be used in the context of a very high order QAM (e.g., 4096QAM) for FR1 (e.g., for the integrated access and backhaul "TAB" or customer premises equipment "CPE" use cases).

Figure 8:
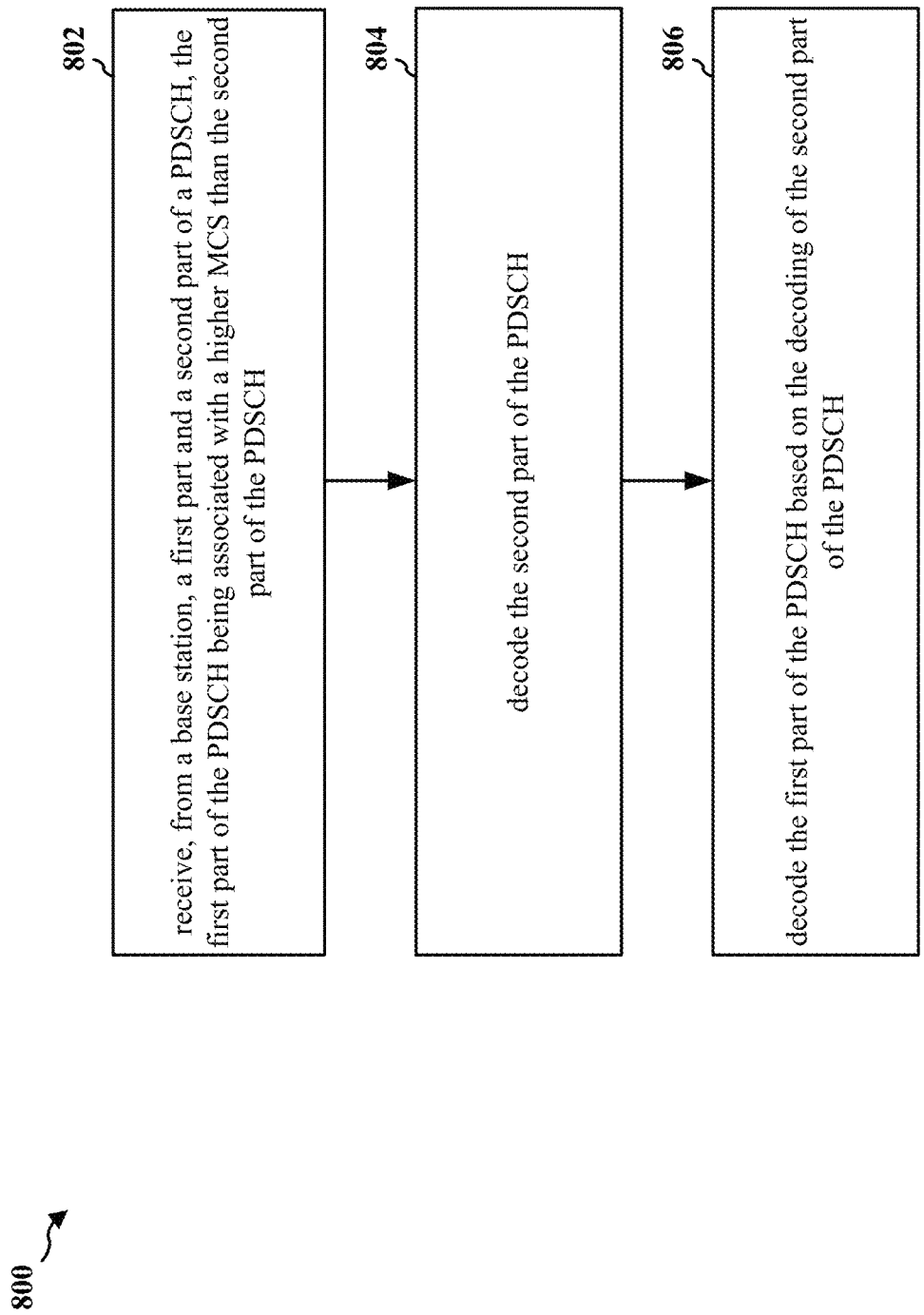
FIG. 8 is a flowchart of a method of wireless communication.

FIG. 8 is a flowchart 800 of a method of wireless communication. The method may be performed by a UE (e.g., the UE 104/350/702; the apparatus 1202). At 802, the UE may receive, from a base station, a first part and a second part of a PDSCH. The first part of the PDSCH may be associated with a higher MCS than the second part of the PDSCH. For example, 802 may be performed by the PDSCH component 1244 in FIG. 12. Referring to FIG. 7, at 712, the UE 702 may receive, from a base station 704, a first part and a second part of a PDSCH.

At 804, the UE may decode the second part of the PDSCH. For example, 804 may be performed by the second decoding component 1246 in FIG. 12. Referring to FIG. 7, at 714, the UE 702 may decode the second part of the PDSCH.

At 806, the UE may decode the first part of the PDSCH based on the decoding of the second part of the PDSCH. For example, 806 may be performed by the first decoding component 1250 in FIG. 12. Referring to FIG. 7, at 718, the UE 702 may decode the first part of the PDSCH based on the decoding of the second part of the PDSCH.

Figure 9:
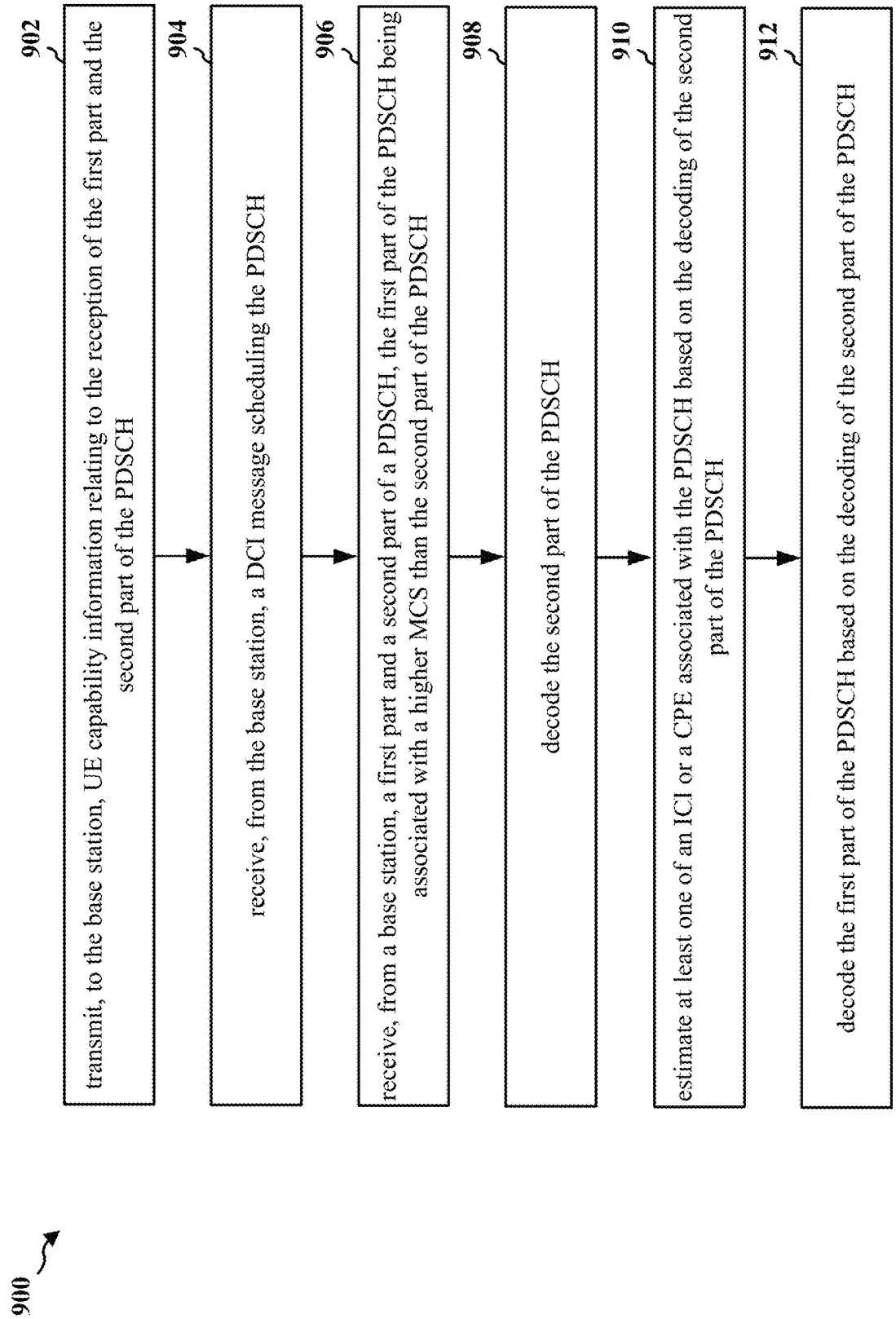
FIG. 9 is a flowchart of a method of wireless communication.

FIG. 9 is a flowchart 900 of a method of wireless communication. The method may be performed by a UE (e.g., the UE 104/350/702; the apparatus 1202). At 906, the UE may receive, from a base station, a first part and a second part of a PDSCH. The first part of the PDSCH may be associated with a higher MCS than the second part of the PDSCH. For example, 906 may be performed by the PDSCH component 1244 in FIG. 12. Referring to FIG. 7, at 712, the UE 702 may receive, from a base station 704, a first part and a second part of a PDSCH.

At 908, the UE may decode the second part of the PDSCH. For example, 908 may be performed by the second decoding component 1246 in FIG. 12. Referring to FIG. 7, at 714, the UE 702 may decode the second part of the PDSCH.

At 912, the UE may decode the first part of the PDSCH based on the decoding of the second part of the PDSCH. For example, 912 may be performed by the first decoding component 1250 in FIG. 12. Referring to FIG. 7, at 718, the UE 702 may decode the first part of the PDSCH based on the decoding of the second part of the PDSCH.

In one configuration, at 910, the UE may estimate at least one of an ICI or a CPE associated with the PDSCH based on the decoding of the second part of the PDSCH. Decoding the first part of the PDSCH based on the decoding of the second part of the PDSCH may include correcting for the at least one of the ICI or the CPE associated with the PDSCH. For example, 910 may be performed by the ICI component 1248 in FIG. 12. Referring to FIG. 7, at 716, the UE 702 may estimate at least one of an ICI or a CPE associated with the PDSCH based on the decoding of the second part of the PDSCH.

In one configuration, at 904, the UE may receive, from the base station, a DCI message scheduling the PDSCH. For example, 904 may be performed by the DCI component 1242 in FIG. 12. Referring to FIG. 7, at 708, the UE 702 may receive, from the base station 704, a DCI message scheduling the PDSCH.

In one configuration, the DCI message may include an indication of the first part and the second part of the PDSCH.

In one configuration, the first part and the second part of the PDSCH may be associated with a single TB and may be associated with different subsets of CBs of the TB.

In one configuration, the DCI message may include indications of MCSs associated with the first part and the second part of the PDSCH.

In one configuration, the DCI message may include an indication of a first MCS associated with the first part of the PDSCH, and a second MCS associated with the second part of the PDSCH may be preconfigured.

In one configuration, the DCI message may include indications of sizes or locations of the first part and the second part of the PDSCH.

In one configuration, the DCI message may include an indication of a first size or a first location associated with the first part of the PDSCH, and a second size or a second location of the second part of the PDSCH may be preconfigured.

In one configuration, the first part of the PDSCH may be associated with a first TB, and the second part of the PDSCH may be associated with a second TB.

In one configuration, at 902, the UE may transmit, to the base station, UE capability information relating to the reception of the first part and the second part of the PDSCH. For example, 902 may be performed by the UE capability component 1240 in FIG. 12. Referring to FIG. 7, at 706, the UE 702 may transmit, to the base station 704, UE capability information relating to the reception of the first part and the second part of the PDSCH.

Figure 10:
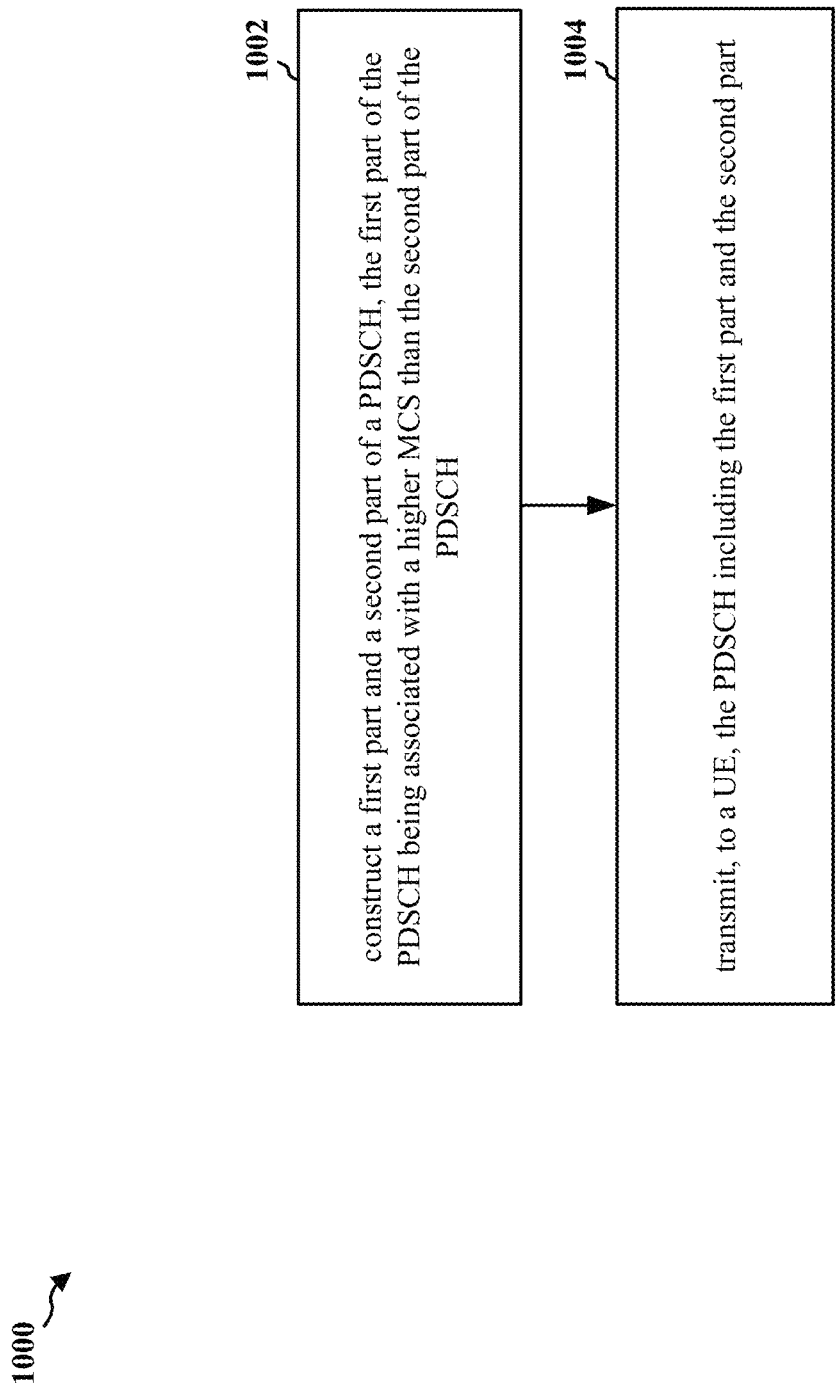
FIG. 10 is a flowchart of a method of wireless communication.

FIG. 10 is a flowchart 1000 of a method of wireless communication. The method may be performed by a base station (e.g., the base station 102/180/310/704; the apparatus 1302). At 1002, the base station may construct a first part and a second part of a PDSCH. The first part of the PDSCH may be associated with a higher MCS than the second part of the PDSCH. For example, 1002 may be performed by the construction component 1344 in FIG. 13. Referring to FIG. 7, at 710, the base station 704 may construct a first part and a second part of a PDSCH.

At 1004, the base station may transmit, to a UE, the PDSCH including the first part and the second part. For example, 1004 may be performed by the PDSCH component 1346 in FIG. 13. Referring to FIG. 7, at 712, the base station 704 may transmit, to a UE 702, the PDSCH including the first part and the second part.

Figure 11:
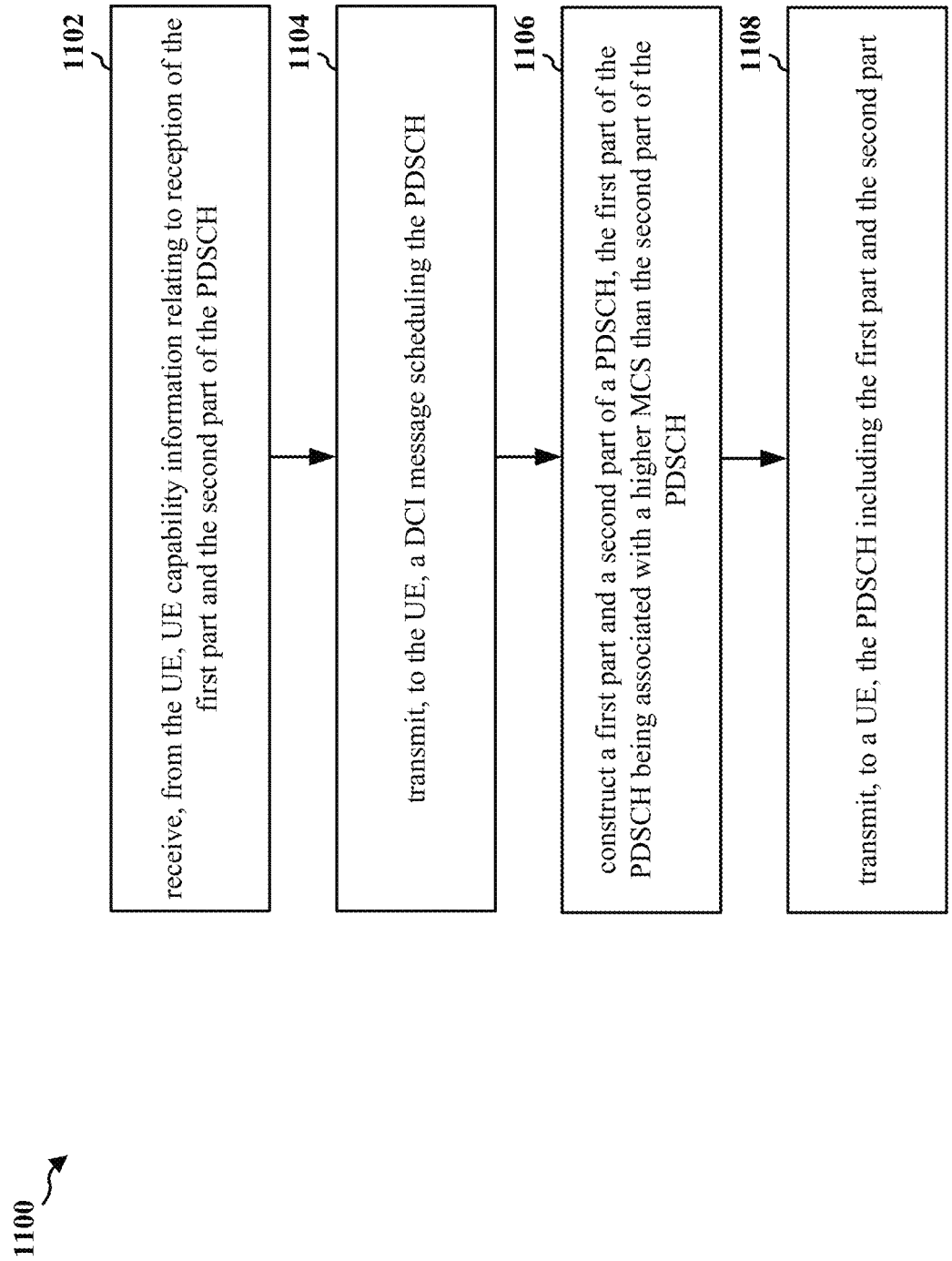
FIG. 11 is a flowchart of a method of wireless communication.

FIG. 11 is a flowchart 1100 of a method of wireless communication. The method may be performed by a base station (e.g., the base station 102/180/310/704; the apparatus 1302). At 1106, the base station may construct a first part and a second part of a PDSCH. The first part of the PDSCH may be associated with a higher MCS than the second part of the PDSCH. For example, 1106 may be performed by the construction component 1344 in FIG. 13. Referring to FIG. 7, at 710, the base station 704 may construct a first part and a second part of a PDSCH.

At 1108, the base station may transmit, to a UE, the PDSCH including the first part and the second part. For example, 1108 may be performed by the PDSCH component 1346 in FIG. 13. Referring to FIG. 7, at 712, the base station 704 may transmit, to a UE 702, the PDSCH including the first part and the second part.

In one configuration, at 1104, the base station may transmit, to the UE, a DCI message scheduling the PDSCH. For example, 1104 may be performed by the DCI component 1342 in FIG. 13. Referring to FIG. 7, at 708, the base station 704 may transmit, to the UE 702, a DCI message scheduling the PDSCH.

In one configuration, the DCI message may include an indication of the first part and the second part of the PDSCH.

In one configuration, the first part and the second part of the PDSCH may be associated with a single TB and may be associated with different subsets of CBs of the TB.

In one configuration, the DCI message may include indications of MCSs associated with the first part and the second part of the PDSCH.

In one configuration, the DCI message may include an indication of a first MCS associated with the first part of the PDSCH, and a second MCS associated with the second part of the PDSCH may be preconfigured.

In one configuration, the DCI message may include indications of sizes or locations of the first part and the second part of the PDSCH.

In one configuration, the DCI message may include an indication of a first size or a first location associated with the first part of the PDSCH, and a second size or a second location of the second part of the PDSCH may be preconfigured.

In one configuration, the first part of the PDSCH may be associated with a first TB, and the second part of the PDSCH may be associated with a second TB.

In one configuration, at 706, the base station may receive, from the UE, UE capability information relating to reception of the first part and the second part of the PDSCH. For example, 706 may be performed by the UE capability component 1340 in FIG. 13. Referring to FIG. 7, at 706, the base station 704 may receive, from the UE 702, UE capability information relating to reception of the first part and the second part of the PDSCH.

In one configuration, at least one of an ICI or a CPE associated with the PDSCH may be estimatable based on the second part of the PDSCH.

Figure 12:
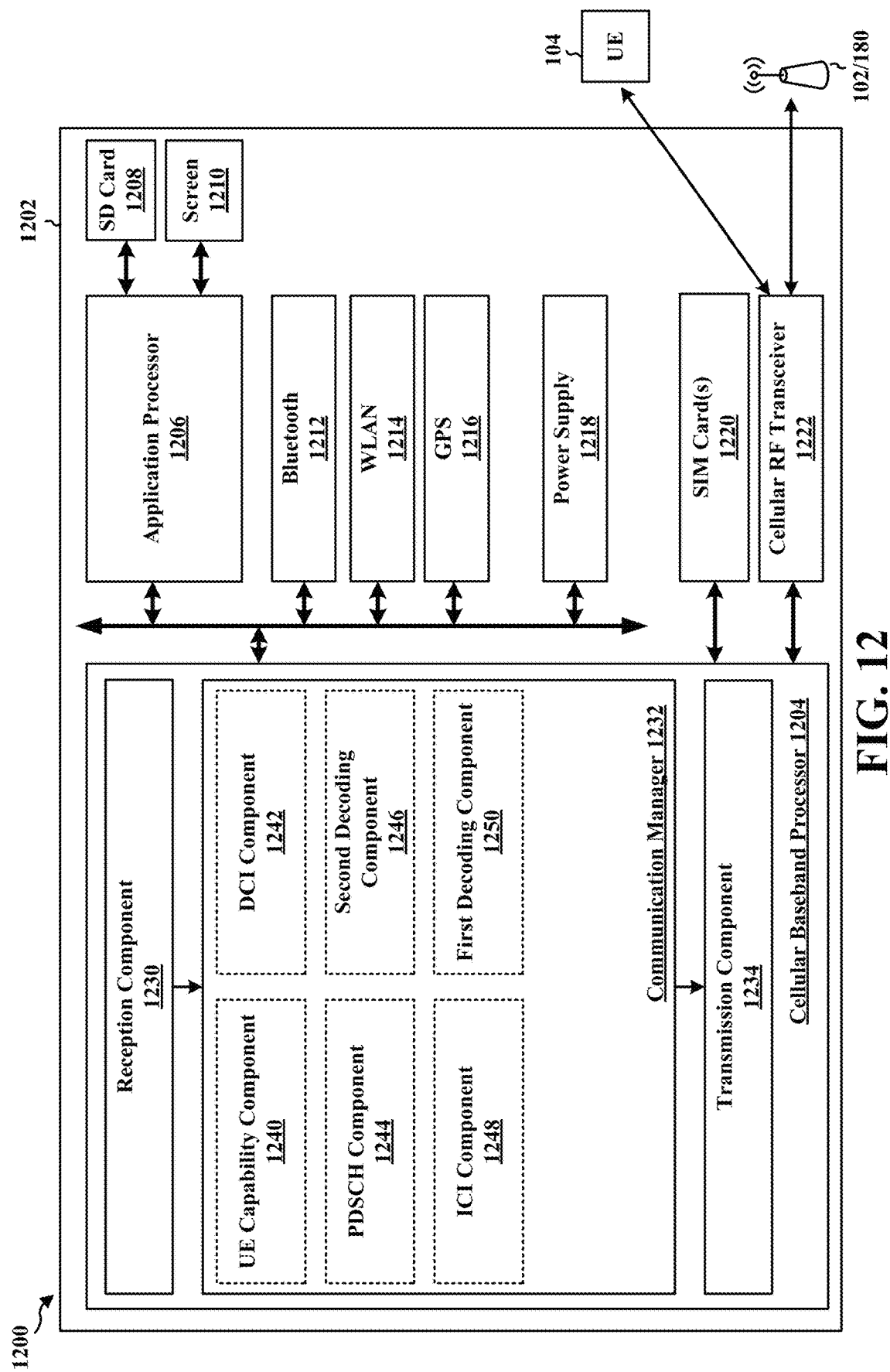
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a UE capability component 1240 that may be configured to transmit, to the base station, UE capability information relating to the reception of the first part and the second part of the PDSCH, e.g., as described in connection with 902 in FIG. 9. The communication manager 1232 further includes a DCI component 1242 that may be configured to receive, from the base station, a DCI message scheduling the PDSCH, e.g., as described in connection with 904 in FIG. 9. The communication manager 1232 further includes a PDSCH component 1244 that may be configured to receive, from a base station, a first part and a second part of a PDSCH, the first part of the PDSCH being associated with a higher MCS than the second part of the PDSCH, e.g., as described in connection with 802 in FIGS. 8 and 906 in FIG. 9. The communication manager 1232 further includes a second decoding component 1246 that may be configured to decode the second part of the PDSCH, e.g., as described in connection with 804 in FIGS. 8 and 908 in FIG. 9. The communication manager 1232 further includes an ICI component 1248 that may be configured to estimate at least one of an ICI or a CPE associated with the PDSCH based on the decoding of the second part of the PDSCH, e.g., as described in connection with 910 in FIG. 9. The communication manager 1232 further includes a first decoding component 1250 that may be configured to decode the first part of the PDSCH based on the decoding of the second part of the PDSCH, e.g., as described in connection with 806 in FIGS. 8 and 912 in FIG. 9.

The apparatus may include additional components that perform each of the blocks of the algorithm in the flowcharts of FIGS. 7-9. As such, each block in the flowcharts of FIGS. 7-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving, from a base station, a first part and a second part of a PDSCH. The first part of the PDSCH may be associated with a higher MCS than the second part of the PDSCH. The apparatus 1202 may include means for decoding the second part of the PDSCH. The apparatus 1202 may include means for decoding the first part of the PDSCH based on the decoding of the second part of the PDSCH.

In one configuration, the apparatus 1202 may include means for estimating at least one of an ICI or a CPE associated with the PDSCH based on the decoding of the second part of the PDSCH. Decoding the first part of the PDSCH based on the decoding of the second part of the PDSCH may include correcting for the at least one of the ICI or the CPE associated with the PDSCH. In one configuration, the apparatus 1202 may include means for receiving, from the base station, a DCI message scheduling the PDSCH. In one configuration, the DCI message may include an indication of the first part and the second part of the PDSCH. In one configuration, the first part and the second part of the PDSCH may be associated with a single TB and may be associated with different subsets of CBs of the TB. In one configuration, the DCI message may include indications of MCSs associated with the first part and the second part of the PDSCH. In one configuration, the DCI message may include an indication of a first MCS associated with the first part of the PDSCH, and a second MCS associated with the second part of the PDSCH may be preconfigured. In one configuration, the DCI message may include indications of sizes or locations of the first part and the second part of the PDSCH. In one configuration, the DCI message may include an indication of a first size or a first location associated with the first part of the PDSCH, and a second size or a second location of the second part of the PDSCH may be preconfigured. In one configuration, the first part of the PDSCH may be associated with a first TB, and the second part of the PDSCH may be associated with a second TB. In one configuration, the apparatus 1202 may include means for transmitting, to the base station, UE capability information relating to the reception of the first part and the second part of the PDSCH.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
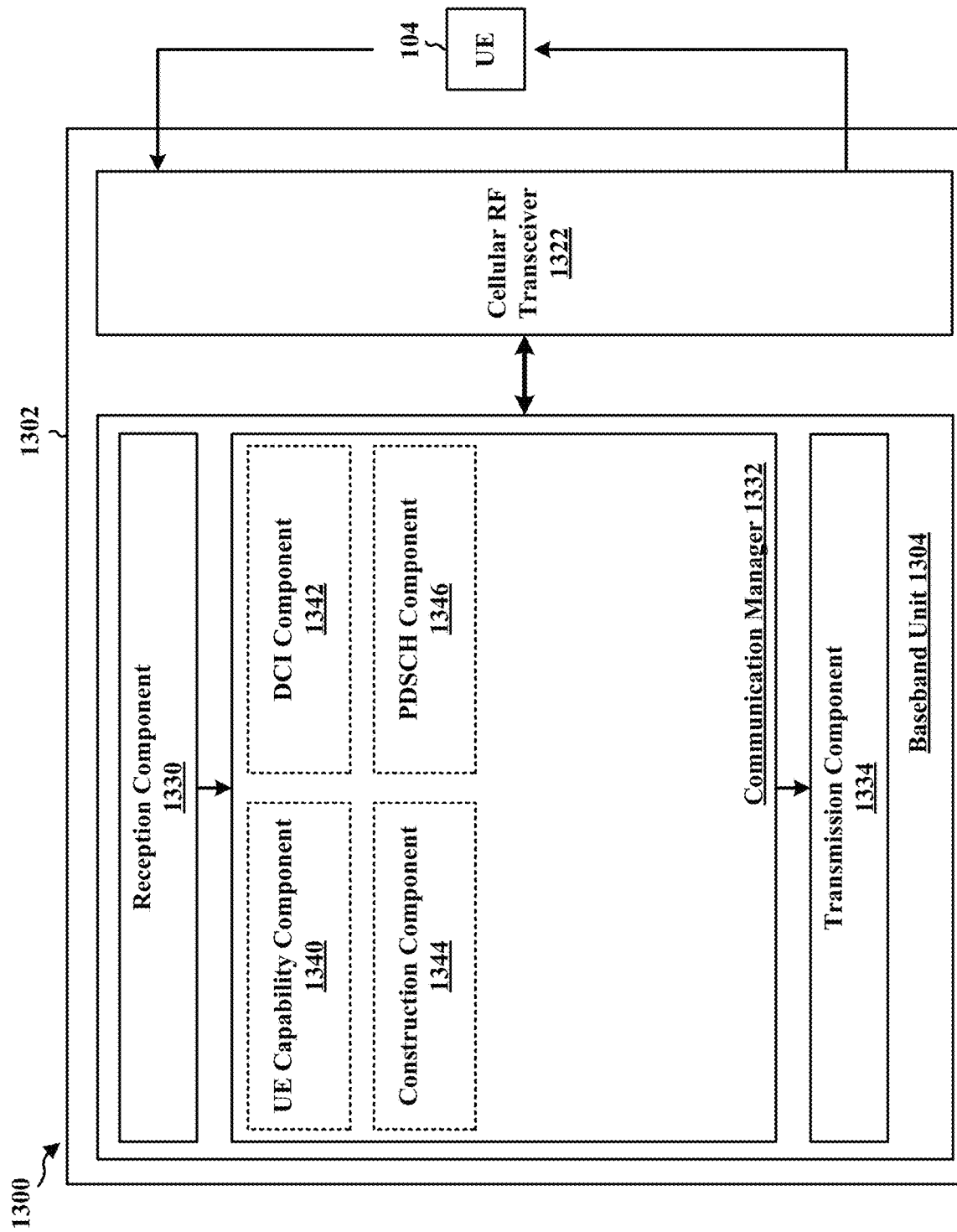
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1202 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a UE capability component 1340 that may be configured to receive, from the UE, UE capability information relating to reception of the first part and the second part of the PDSCH, e.g., as described in connection with 1102 in FIG. 11. The communication manager 1332 further includes a DCI component 1342 that may be configured to transmit, to the UE, a DCI message scheduling the PDSCH, e.g., as described in connection with 1104 in FIG. 11. The communication manager 1332 further includes a construction component 1344 that may be configured to construct a first part and a second part of a PDSCH, the first part of the PDSCH being associated with a higher MCS than the second part of the PDSCH, e.g., as described in connection with 1002 in FIGS. 10 and 1106 in FIG. 11. The communication manager 1332 further includes a PDSCH component 1346 that may be configured to transmit, to a UE, the PDSCH including the first part and the second part, e.g., as described in connection with 1004 in FIGS. 10 and 1108 in FIG. 11.

The apparatus may include additional components that perform each of the blocks of the algorithm in the flowcharts of FIGS. 7, 10, and 11. As such, each block in the flowcharts of FIGS. 7, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for constructing a first part and a second part of a PDSCH. The first part of the PDSCH may be associated with a higher MCS than the second part of the PDSCH. The apparatus 1302 may include means for transmitting, to a UE, the PDSCH including the first part and the second part.

In one configuration, the apparatus 1302 may include means for transmitting, to the UE, a DCI message scheduling the PDSCH. In one configuration, the DCI message may include an indication of the first part and the second part of the PDSCH. In one configuration, the first part and the second part of the PDSCH may be associated with a single TB and may be associated with different subsets of CBs of the TB. In one configuration, the DCI message may include indications of MCSs associated with the first part and the second part of the PDSCH. In one configuration, the DCI message may include an indication of a first MCS associated with the first part of the PDSCH, and a second MCS associated with the second part of the PDSCH may be preconfigured. In one configuration, the DCI message may include indications of sizes or locations of the first part and the second part of the PDSCH. In one configuration, the DCI message may include an indication of a first size or a first location associated with the first part of the PDSCH, and a second size or a second location of the second part of the PDSCH may be preconfigured. In one configuration, the first part of the PDSCH may be associated with a first TB, and the second part of the PDSCH may be associated with a second TB. In one configuration, the apparatus 1302 may include means for receiving, from the UE, UE capability information relating to reception of the first part and the second part of the PDSCH. In one configuration, at least one of an ICI or a CPE associated with the PDSCH may be estimatable based on the second part of the PDSCH.

The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

Aspects described herein may relate to a data-aided method of blind PN estimation. The base station may transmit to the UE, a first part and a second part of a PDSCH. The UE may decode the second part of the PDSCH. The UE may estimate at least one of an ICI or a CPE associated with the PDSCH based on the decoding of the second part of the PDSCH. The UE may decode the first part of the PDSCH based on the decoding of the second part of the PDSCH. Decoding the first part of the PDSCH based on the decoding of the second part of the PDSCH may include correcting for the at least one of the ICI or the CPE associated with the PDSCH. Accordingly, PN related ICI and CPE may be mitigated with zero or very low overhead. A higher throughput may be achieved due to additional data carrying capabilities and the ability for ICI error floor mitigation. Higher order QAM modulations such as 1k or 4k QAM, for both FR2 and FR1, may be enabled.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, a first part and a second part of a PDSCH, the first part of the PDSCH being associated with a higher MCS than the second part of the PDSCH; decode the second part of the PDSCH; and decode the first part of the PDSCH based on the decoding of the second part of the PDSCH.

Aspect 2 is the apparatus of aspect 1, the at least one processor being further configured to: estimate at least one of an ICI or a CPE associated with the PDSCH based on the decoding of the second part of the PDSCH, where decoding the first part of the PDSCH based on the decoding of the second part of the PDSCH includes correcting for the at least one of the ICI or the CPE associated with the PDSCH.

Aspect 3 is the apparatus of any of aspects 1 and 2, the at least one processor being further configured to: receive, from the base station, a DCI message scheduling the PDSCH.

Aspect 4 is the apparatus of aspect 3, where the DCI message includes an indication of the first part and the second part of the PDSCH.

Aspect 5 is the apparatus of any of aspects 3 and 4, where the first part and the second part of the PDSCH are associated with a single TB and are associated with different subsets of CBs of the TB.

Aspect 6 is the apparatus of aspect 5, where the DCI message includes indications of MCSs associated with the first part and the second part of the PDSCH.

Aspect 7 is the apparatus of aspect 5, where the DCI message includes an indication of a first MCS associated with the first part of the PDSCH, and a second MCS associated with the second part of the PDSCH is preconfigured.

Aspect 8 is the apparatus of any of aspects 3 to 7 and 10, where the DCI message includes indications of sizes or locations of the first part and the second part of the PDSCH.

Aspect 9 is the apparatus of any of aspects 3 to 7 and 10, where the DCI message includes an indication of a first size or a first location associated with the first part of the PDSCH, and a second size or a second location of the second part of the PDSCH is preconfigured.

Aspect 10 is the apparatus of any of aspects 1 to 4, where the first part of the PDSCH is associated with a first TB, and the second part of the PDSCH is associated with a second TB.

Aspect 11 is the apparatus of any of aspects 1 to 10, the at least one processor being further configured to: transmit, to the base station, UE capability information relating to the reception of the first part and the second part of the PDSCH.

Aspect 12 is the apparatus of any of aspects 1 to 11, further including a transceiver coupled to the at least one processor.

Aspect 13 is an apparatus for wireless communication at a baes station including at least one processor coupled to a memory and configured to construct a first part and a second part of a PDSCH, the first part of the PDSCH being associated with a higher MCS than the second part of the PDSCH; and transmit, to a UE, the PDSCH including the first part and the second part.

Aspect 14 is the apparatus of aspect 13, the at least one processor being further configured to: transmit, to the UE, a DCI message scheduling the PDSCH.

Aspect 15 is the apparatus of aspect 14, where the DCI message includes an indication of the first part and the second part of the PDSCH.

Aspect 16 is the apparatus of any of aspects 14 and 15, where the first part and the second part of the PDSCH are associated with a single TB and are associated with different subsets of CBs of the TB.

Aspect 17 is the apparatus of aspect 16, where the DCI message includes indications of MCSs associated with the first part and the second part of the PDSCH.

Aspect 18 is the apparatus of aspect 16, where the DCI message includes an indication of a first MCS associated with the first part of the PDSCH, and a second MCS associated with the second part of the PDSCH is preconfigured.

Aspect 19 is the apparatus of any of aspects 14 to 18 and 21, where the DCI message includes indications of sizes or locations of the first part and the second part of the PDSCH.

Aspect 20 is the apparatus of any of aspects 14 to 18 and 21, where the DCI message includes an indication of a first size or a first location associated with the first part of the PDSCH, and a second size or a second location of the second part of the PDSCH is preconfigured.

Aspect 21 is the apparatus of any of aspects 13 to 15, where the first part of the PDSCH is associated with a first TB, and the second part of the PDSCH is associated with a second TB.

Aspect 22 is the apparatus of any of aspects 13 to 21, the at least one processor being further configured to: receive, from the UE, UE capability information relating to reception of the first part and the second part of the PDSCH.

Aspect 23 is the apparatus of any of aspects 13 to 22, where at least one of an ICI or a CPE associated with the PDSCH is estimatable based on the second part of the PDSCH.

Aspect 24 is the apparatus of any of aspects 13 to 23, further including a transceiver coupled to the at least one processor.

Aspect 25 is a method of wireless communication for implementing any of aspects 1 to 24.

Aspect 26 is an apparatus for wireless communication including means for implementing any of aspects 1 to 24.

Aspect 27 is a computer-readable medium storing computer executable code, where the code when executed by a processor causes the processor to implement any of aspects 1 to 24.

What is claimed is:

1. An apparatus for wireless communication at a user equipment (UE), comprising:
    memory; and
    at least one processor coupled to the memory and configured to:
        receive, from a base station, a downlink control information (DCI) message scheduling a physical downlink shared channel (PDSCH) transmission, the DCI message indicating a second part of the PDSCH transmission having a lower modulation and coding scheme (MCS) than a first part of the PDSCH transmission, wherein the second part of the PDSCH transmission includes contiguous resources in a frequency domain and overlaps in time with the first part of the PDSCH transmission;
        receive, from the base station, the first part and the second part of the PDSCH transmission;
        estimate at least one of an inter-carrier interference (ICI) or a common phase error (CPE) based on the second part of the PDSCH transmission that has the lower MCS than the first part of the PDSCH transmission; and
        decode the first part of the PDSCH transmission including correction for the at least one of the ICI or the CPE based on the ICI or the CPE estimated for the second part of the PDSCH transmission.

2. The apparatus of claim 1, wherein the DCI message includes an indication of the first part and the second part of the PDSCH transmission.

3. The apparatus of claim 1, wherein the first part and the second part of the PDSCH transmission are associated with a single transport block (TB) and are associated with different subsets of code blocks (CBs) of the TB.

4. The apparatus of claim 3, wherein the DCI message includes indications of MCSs associated with the first part and the second part of the PDSCH transmission.

5. The apparatus of claim 3, wherein the DCI message includes an indication of a first MCS associated with the first part of the PDSCH transmission, and a second MCS associated with the second part of the PDSCH transmission is preconfigured.

6. The apparatus of claim 1, wherein the DCI message includes indications of sizes or locations of the first part and the second part of the PDSCH transmission.

7. The apparatus of claim 1, wherein the DCI message includes an indication of a first size or a first location associated with the first part of the PDSCH transmission, and a second size or a second location of the second part of the PDSCH transmission is preconfigured.

8. The apparatus of claim 1, wherein the first part of the PDSCH transmission is associated with a first transport block (TB), and the second part of the PDSCH transmission is associated with a second TB.

9. The apparatus of claim 1, the at least one processor being further configured to:
    transmit, to the base station, UE capability information indicating at least one MCS threshold value, wherein the first part and the second part of the PDSCH transmission are based on the at least one MCS threshold value.

10. The apparatus of claim 1, further comprising a transceiver coupled to the at least one processor.

11. A method of wireless communication performed by a user equipment (UE), comprising:
    receiving, from a base station, a downlink control information (DCI) message scheduling a physical downlink shared channel (PDSCH) transmission, the DCI message indicating a second part of the PDSCH transmission having a lower modulation and coding scheme (MCS) than a first part of the PDSCH transmission, wherein the second part of the PDSCH transmission includes contiguous resources in a frequency domain and overlaps in time with the first part of the PDSCH transmission;
    receiving, from the base station, the first part and the second part of the PDSCH transmission,
    estimating at least one of an inter-carrier interference (ICI) or a common phase error (CPE) based on the second part of the PDSCH transmission that has the lower MCS than the first part of the PDSCH transmission; and
    decoding the first part of the PDSCH transmission including correcting for the at least one of the ICI or the CPE based on the ICI or the CPE estimated for the second part of the PDSCH transmission.

12. An apparatus for wireless communication at a base station, comprising:
    memory; and at least one processor coupled to the memory and configured to:
construct a first part and a second part of a physical downlink shared channel (PDSCH) transmission, the first part of the PDSCH transmission being associated with a higher modulation and coding scheme (MCS) than the second part of the PDSCH transmission, wherein the second part of the PDSCH transmission includes contiguous resources in a frequency domain and overlaps in time with the first part of the PDSCH transmission;
transmit, to a user equipment (UE), a downlink control information (DCI) message scheduling the PDSCH transmission, the DCI message indicating that the second part of the PDSCH transmission has a lower MCS than the first part of the PDSCH transmission; and
transmit, to the UE, the PDSCH transmission including the first part and the second part.

13. The apparatus of claim 12, wherein the DCI message includes an indication of the first part and the second part of the PDSCH transmission.

14. The apparatus of claim 12, wherein the first part and the second part of the PDSCH transmission are associated with a single transport block (TB) and are associated with different subsets of code blocks (CBs) of the TB.

15. The apparatus of claim 14, wherein the DCI message includes indications of MCSs associated with the first part and the second part of the PDSCH transmission.

16. The apparatus of claim 14, wherein the DCI message includes an indication of a first MCS associated with the first part of the PDSCH transmission, and a second MCS associated with the second part of the PDSCH transmission is preconfigured.

17. The apparatus of claim 12, wherein the DCI message includes indications of sizes or locations of the first part and the second part of the PDSCH transmission.

18. The apparatus of claim 12, wherein the DCI message includes an indication of a first size or a first location associated with the first part of the PDSCH transmission, and a second size or a second location of the second part of the PDSCH transmission is preconfigured.

19. The apparatus of claim 12, wherein the first part of the PDSCH transmission is associated with a first transport block (TB), and the second part of the PDSCH transmission is associated with a second TB.

20. The apparatus of claim 12, the at least one processor being further configured to:
receive, from the UE, UE capability information indicating at least one MCS threshold value.

21. The apparatus of claim 12, wherein at least one of an inter-carrier interference (ICI) or a common phase error (CPE) associated with the PDSCH transmission is estimatable based on the second part of the PDSCH transmission.

22. The apparatus of claim 12, further comprising a transceiver coupled to the at least one processor.

23. A method of wireless communication at a base station, comprising:
constructing a first part and a second part of a physical downlink shared channel (PDSCH) transmission, the first part of the PDSCH transmission being associated with a higher modulation and coding scheme (MCS) than the second part of the PDSCH transmission, wherein the second part of the PDSCH transmission includes contiguous resources in a frequency domain and overlaps in time with the first part of the PDSCH transmission;
transmitting, to a user equipment (UE), a downlink control information (DCI) message scheduling the PDSCH transmission, the DCI message indicating that the second part of the PDSCH transmission has a lower MCS than the first part of the PDSCH transmission; and
transmitting, to the UE, the PDSCH including the first part and the second part.

24. The method of claim 23, wherein the DCI message includes an indication of the first part and the second part of the PDSCH transmission.

* * * * *